United States Patent [19]
Tominaga et al.

[11] Patent Number: 5,722,347
[45] Date of Patent: Mar. 3, 1998

[54] FLOATING ISLAND FOR AQUARIUM

[75] Inventors: Kazutoshi Tominaga, Higashiosakashi, Japan; Robert C. Krause, 2605 S. Clearbrook Dr., Arlington Heights, Ill. 60006

[73] Assignee: Robert C. Krause, Arlington Heights, Ill.

[21] Appl. No.: 773,552

[22] Filed: Dec. 27, 1996

[30] Foreign Application Priority Data

Dec. 28, 1995 [JP] Japan .................................. 7-343432

[51] Int. Cl.⁶ .................................................... A61C 63/00
[52] U.S. Cl. ............................ 119/253; 119/256; 119/245
[58] Field of Search .................................... 119/253, 256, 119/245, 223

[56] References Cited

U.S. PATENT DOCUMENTS

| D. 167,243 | 7/1952 | Yellin | 119/253 X |
|---|---|---|---|
| 3,077,697 | 2/1963 | Fry | 119/253 X |
| 3,803,386 | 4/1974 | Rodrigues | 119/256 X |
| 3,975,845 | 8/1976 | Mellard | 119/256 X |
| 5,257,596 | 11/1993 | Jones | 119/253 X |

*Primary Examiner*—Nicholas D. Lucchesi
*Attorney, Agent, or Firm*—Armstrong, Westerman, Hattori, McLeland & Naughton

[57] ABSTRACT

A floating island for an aquarium according to the invention includes a board-shaped floating island body, a supporting rod and a fixing device. One or a plurality of the supporting rod are slidably inserted in the floating island body in the direction of the thickness of the floating island body. The supporting rod is fixed in un upright state in an aquarium by a fixing device. The floating island body can stably stay on the water by the supporting rods, and can also automatically move up and down in accordance with the change of the water level.

12 Claims, 4 Drawing Sheets

FLOATING ISLAND FOR AQUARIUM

BACKGROUND OF INVENTION

1. Field of the Invention

The present invention relates to a floating island for an aquarium, and more particularly to a floating island which is set afloat in an aquarium as a floating island as a resting place for reptiles such as turtles or amphibians such as frogs in an aquarium. Especially, the floating island is suitably used for a turtle to bask in the sun.

2. Related Art

Conventional floating islands of this kind are set afloat in an aquarium by using their buoyancy.

This type of floating island, however, lacks stability on the water because it floats without any aids. Thus, it can be tossed, rocked or rolled on the water when an amphibian such as a turtle tries to land on it. This sometimes may cause an amphibian to fail to land on it. For turtles, especially for baby turtles lacking exercise abilities, it is essential for them, to bask in the sun to maintain their health so as not to shorten their life.

OBJECTS OF THE INVENTION

An object of the present invention which was made to resolve the aforementioned problems is, therefore, to provide a floating island which can be stably set afloat in an aquarium.

Other objects of the present invention are to provide a floating island which can be easily manufactured and used.

Other objects and advantages of the present invention will become apparent from the description contained herein. It should be recognized that the examples are to describe preferable embodiments of the present invention.. Accordingly, the invention is not limited to the examples and various modifications are possible within the spirit and the scope of the invention claimed.

SUMMARY OF THE INVENTION

To attain the above-mentioned objects, according to the present invention, a floating island includes a supporting rod to be fixed in an aquarium and a floating island body slidably combined with the supporting rod such that the floating island body can move up and down in accordance with the change of the water level in the aquarium.

That is, the present invention includes a floating island body, one or a plurality of supporting rods combined with the floating island body so that the floating island body can move up and down, and fixing means to fix the supporting rod in an upright state in the aquarium.

The supporting rod is desirably shaped to imitate a trunk of a tree because the floating island is useful not only for animals but also an accessory.

The fixing means for fixing the supporting rod is desirably a sucker which can detacheably adhere to the inside surface of the aquarium without damaging the aquarium.

The floating island body, through which the supporting rod is slidably inserted such that the floating island body moves up and down, can be kept floating on the water in spite of the changes of the water level.

DETAILED DESCRIPTION OF THE PREFERRED EMBODIMENTS

Figure 1:
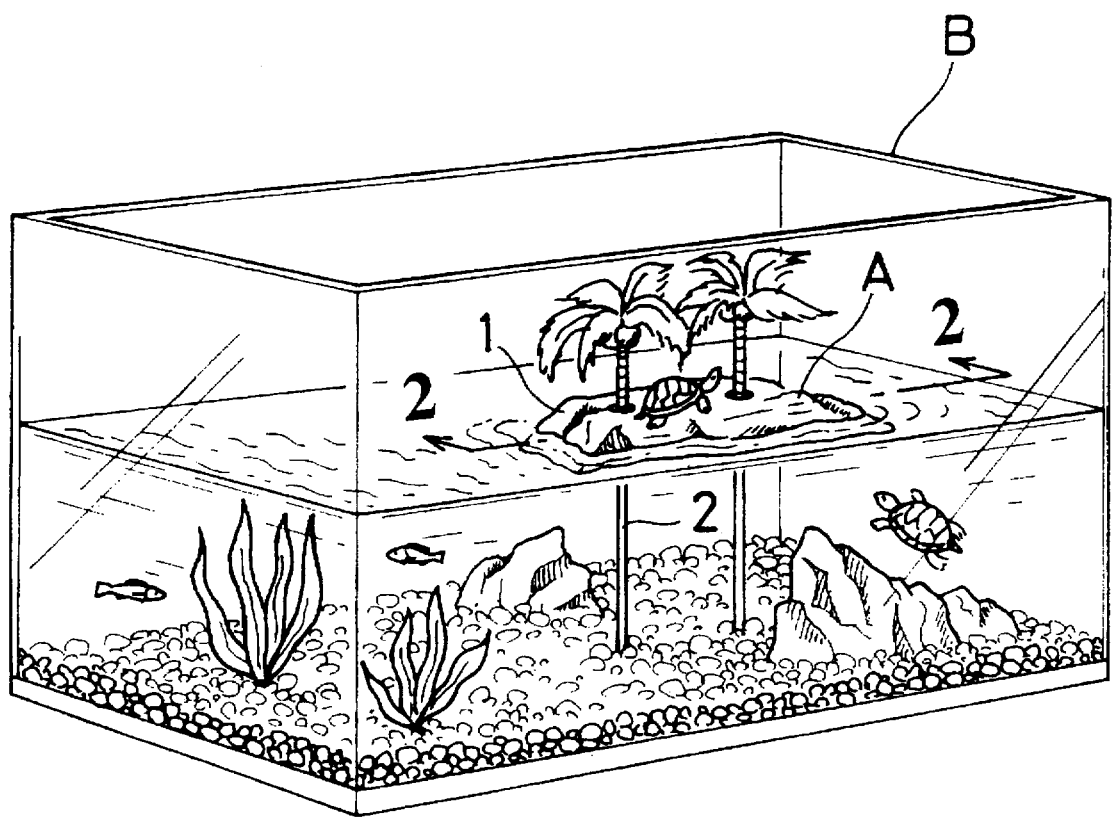
FIG. 1 shows a perspective view of a floating island in actual use according the present invention.
Figure 2:
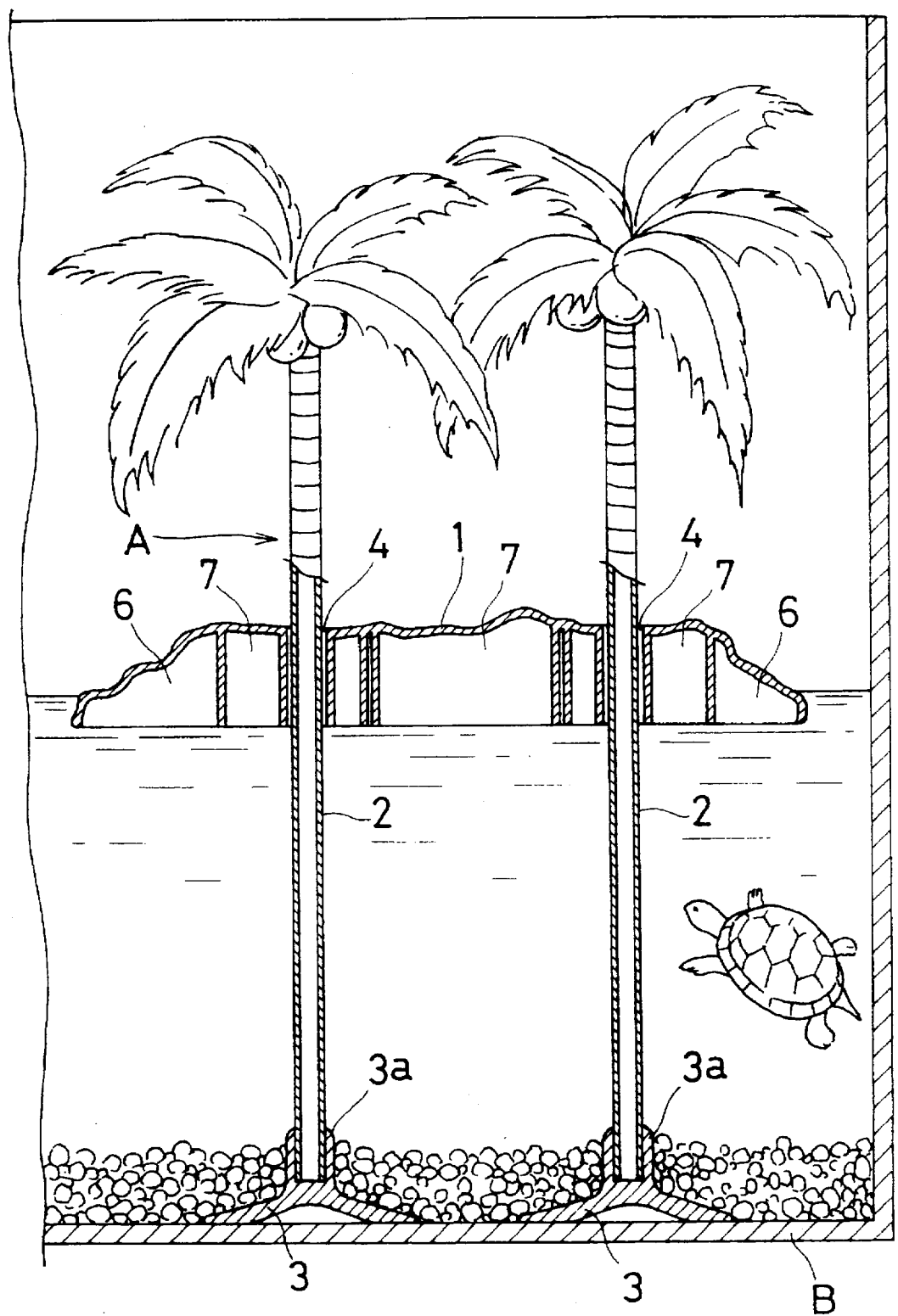
FIG. 2 shows a cross-sectional view taken along the line 2—2 in FIG. 1.
Figure 3:
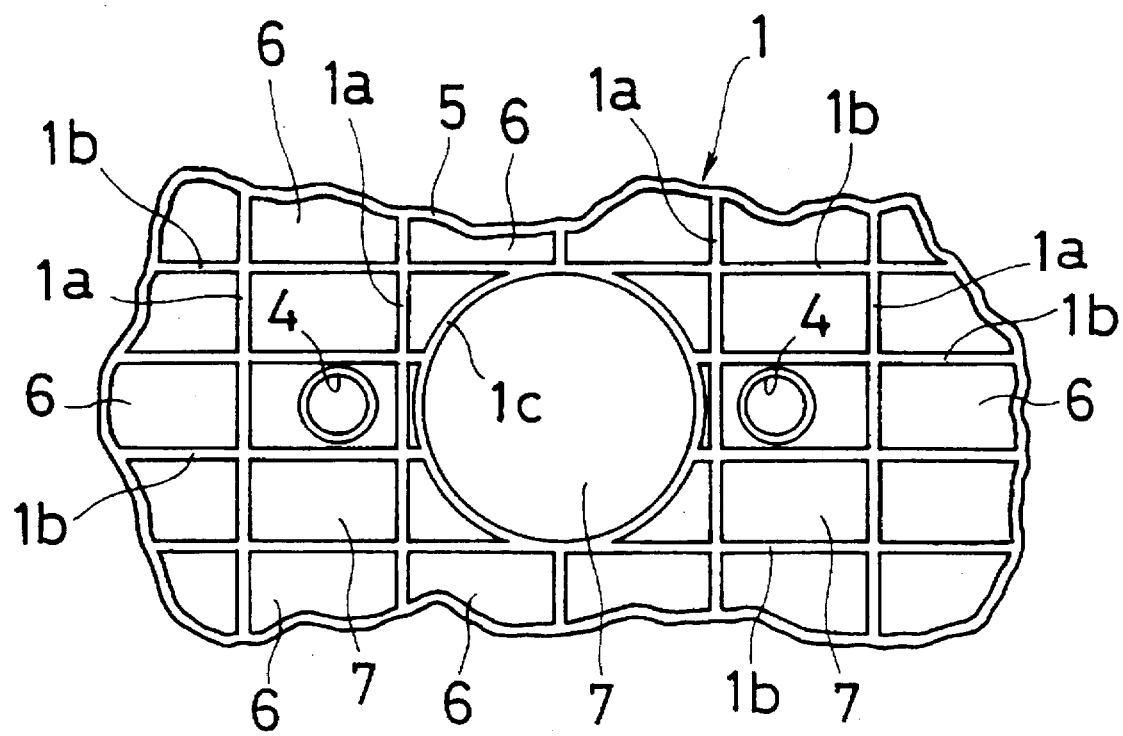
FIG. 3 shows a bottom view of the floating island of the embodiment shown in FIG. 1.

Preferred embodiments according to the present invention will now be described in detail, with reference to the accompanying drawings.

A floating island A according to the present invention includes a board-shaped floating island body 1, a supporting rod 2 slidably penetrating into in the floating island body 1 so that the floating island body 1 can move up and down in accordance with the water level change in an aquarium B, and fixing means 3 fixing the supporting rod 2 in an upright state in the aquarium B.

The floating island body 1 is an integrally formed plastic board-shaped bottom-opened article. The floating island body 1 has wall-shaped ribs 1a, 1b integrally formed lengthwise and crosswise at its whole bottom area and a cylindrical rib 1c integrally formed at the bottom center of the floating island body 1. A top wall portion 5 of the floating island body 1 and the ribs 1a 1b 1c provide a plurality of bottom-opened independent spaces. According to the above structure of the floating island body 1, the floating island body 1 floats on the water by buoyancy caused by the bottom-opened spaces 6, 7 surrounded by the top wall portion 5, wall-shaped ribs 1a, 1b and the cylindrical rib 1c.

As shown in the above embodiment, if the floating island body 1 is formed to have bottom-opened spaces which form closed air spaces 6, 7 when placed on the water so that buoyancy is imparted to the floating island body 1, the floating island body 1 can be easily manufactured by plastic integral molding. However, this invention is not limited to this construction. For instance, a floating island body may have a closed air space in the floating island body covering the bottom portion thereof. Further, a floating island body may be made of lower specific gravity materials so as to cause buoyancy by itself without having any air space.

A pair of cylindrical inserting openings 4, 4 are integrally formed in the floating island body 1 with a certain distance such that each supporting rod 2, 2 penetrates the floating island body in the direction of up and down, i.e., in the direction of the thickness. Each cylindrical inserting opening 4, 4 is formed to have an internal diameter so that a narrow gap is formed between the supporting rod 2, 2 and the inner surface of the opening 4 so as to allow the floating island body 1 to freely move up and down in accordance with a change of the water level. By forming a cylindrical portion around the inserting opening 4 through which the supporting rod 2 is inserted, the floating island body 1 is restrained from inclining against the Supporting rod 2, i.e., inclining on the water. Therefore, the floating island body 1 doesn't incline beyond a predetermined angle when amphibians such as turtles try to land on the floating island body 1, thereby enabling easy landing on it. If a plurality of inserting openings 4 are provided with the floating island body 1 and supporting rods 2 are inserted in each of the inserting openings 4, as shown in the embodiment, the floating island body 1 is certainly prevented from turning on the water. Thus, together with the inclination preventing effect as mentioned above, the floating island body can stably stay on the water.

The supporting rod 2 is made as a plastic molded article formed like a palm tree with limbs and leaves at its upper portion.

As a fixing means for fixing the supporting rod 2 in an upright state in the aquarium, a sucker 3 is adopted in the embodiment. The sucker 3 is provided with, at its top end, a recessed holding portion 3a for detachably fixing the lower end portion of the supporting rod 2. By fitting the lower end portion of the supporting rod 2 into the recessed holding portion 3a of the sucker 3 which is fixed in the aquarium B, the supporting rod 2 can be stably fixed in a vertical state in the aquarium B.

To set the floating island body A in the aquarium B, firstly, each supporting rod 2, 2 is penetrated through the inserting opening 4, 4 of the floating island body 1. Next, each lower end portion of the supporting rod 2, 2 is fitted into the recessed holding portion 3a, 3a of the suckers 3, 3, and then the suckers 3, 3 are fixed on the inner bottom surface of the aquarium B. Alternatively, the suckers 3, 3 are fixed on predetermined portions of the inner surface of the bottom portion in the aquarium B, and then each lower end portion of the supporting rod 2, 2 is fixed into the recessed holding portion 3a, 3a of the corresponding sucker 3. Thus, the supporting rod 2, 2 can be vertically fixed in the aquarium B with the floating island body 1 penetrated by each supporting rod 2. Thereafter, water is poured into the aquarium B. As a result, the floating island body 1 floats on the water in accordance with the rising water level by the buoyancy of the air confined between each of the bottom-opened spaces 6, 7 and the water surface. Thus, the floating island body 1 fulfills its function as a floating island A at an expected water level.

As is apparent from the above, it is necessary that a certain gap is formed between the supporting rod 2 and the cylindrical inserting opening 4. The gap allows the floating island body 1 to move up and down in accordance with a water level change because the gap prevents a large friction from being caused between the cylindrical penetration opening 4 and the supporting rod However, if there is too much of a gap between the supporting rod 2, 2 and the cylindrical inserting opening 4, the stability of the floating island body 1 on the water may be lost because the inclination of the floating island body 1 against the supporting rod 2 can become too large. It is, thus, desirable to set the external diameter of the supporting rod 2 and the internal diameter of the cylindrical inserting opening 4 such that the floating island body 1 may freely move up and down in accordance with a water level change and such that the inclination of the floating island body 1 on the water may be kept to a minimum.

As is understood from the above, in the floating island according to this invention, it is not required to adjust the height of the floating island body in accordance with a water level change in the aquarium.

Figure 4:
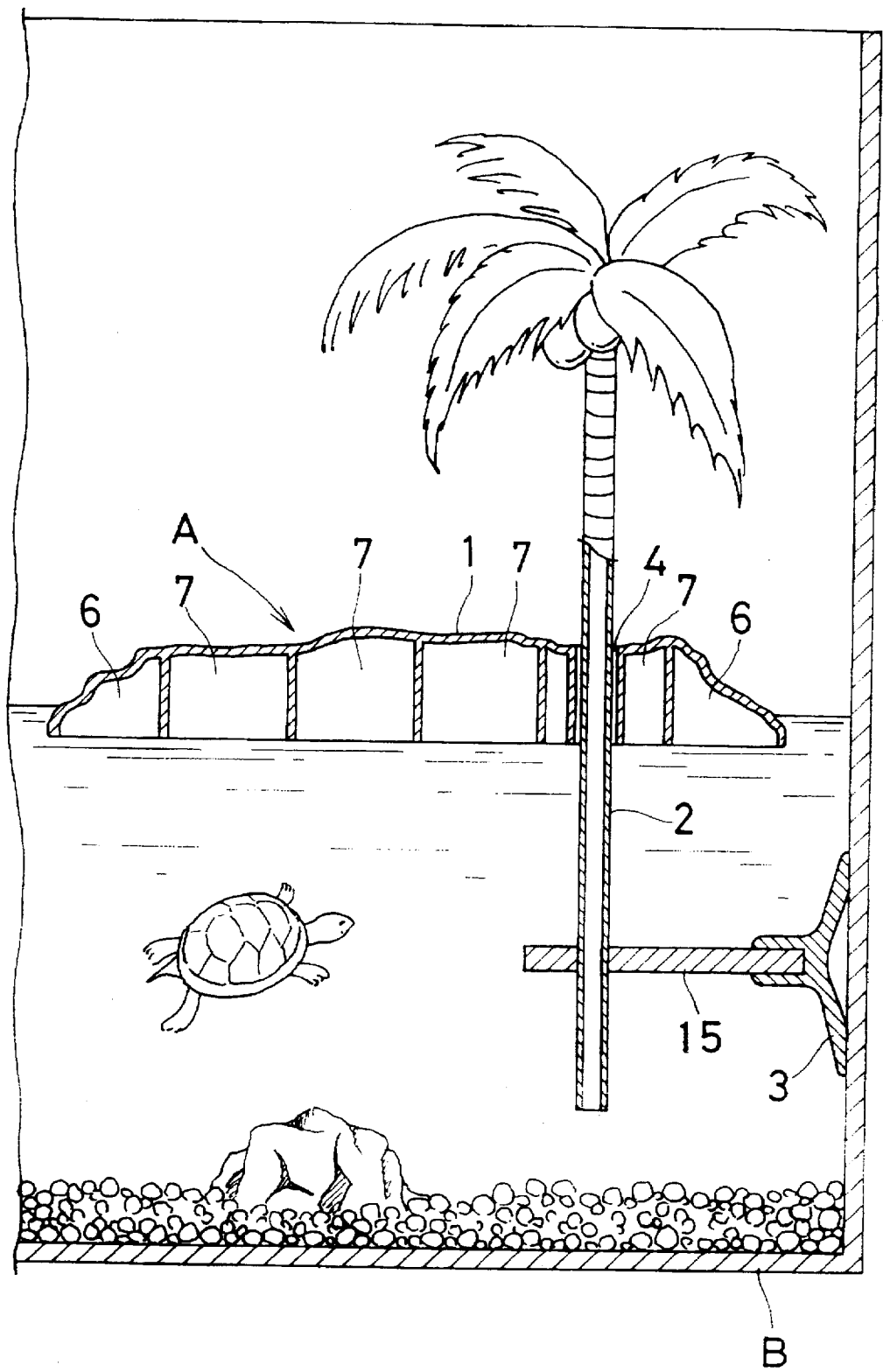
FIG. 4 shows a cross-sectional view Of another embodiment in actual use.

FIG. 4 shows another embodiment. It is same as the above embodiment except for the following points. The explanations of the corresponding portions are omitted by denoting the same numerals.

In this embodiment, the sucker 3, as a fixing means, is fixed on the inner surface of the side wall of the aquarium B. A fixing means 5 is attached to the sucker 3 such that the fixing means 5 is disposed horizontally in the aquarium B. The fixing means 5 has an fitting opening (not shown). By fitting the lower end portion of the supporting rod 2 into the fitting opening, the supporting rod 2 is fixed in an upright state in the aquarium B.

In both the above-mentioned embodiments, although the supporting rod 2 is formed to imitate a trunk of a tree for an accessory, the present invention is not limited to that construction.

Further, in the present invention, the number of the supporting rods 2 is not limited to the embodiments shown above. If a plurality of supporting rods 2 are provided, there are advantages in the prevention of the floating island body 1 from being rotated on the water. However, only one supporting rod 2 may be provided in the present invention. In this latter case, to prevent the floating island body 1 from rotating on the water, it is desirable that the supporting rod 2 and the inserting opening 4 of the floating island body 1 may have a corresponding non-circular cross-sectional shape, respectively. Alternatively, a stopper which prevents rotation of the floating island body 1 around the supporting rod 2 may be formed to the body 1 and/or the rod 2.

A sinker or a weight may be substituted for the sucker 3 as a fixing means in both of the above embodiments. In the case of using a sinker or a weight, it should be placed in the aquarium B so as not to damage the aquarium B. On the contrary, a sucker 3 shown in the above embodiments will never damage the aquarium B.

In the above embodiments, the floating island body 1 is combined with the supporting rod 2 such that the supporting rod 2 is inserted into the inserting opening 4 formed in the floating island body 1. However, the present invention is not limited to that construction. For example, the supporting rod 2 may be loosely fitted into a cut-out portion which is inwardly formed from the peripheral side of the floating island body 1.

As mentioned above, the floating island according to the present invention includes a floating island body, one or a plurality of supporting rods combined with the floating island body, and a fixing means to fix the supporting rod in an upright state in an aquarium. Thus, the floating island body stably floats on the water and the height of the floating island body is not required to be adjusted because the floating island body automatically moves up and down along the supporting rod in accordance with the water level change in an aquarium.

By adopting a plurality of supporting rods or by adopting a single supporting rod with a rotation preventing means, rotation of the floating island body on the water is prevented, thus the stability thereof is increased. As a result, an amphibian such as a turtle can land on it easily. Therefore, it is useful for them to extend their life.

Because the supporting rod is slidably combined with the floating island body, the structure is not complex and does not cause trouble.

When the supporting rod is formed to imitate a trunk of a tree, it enhances the appearance of the floating island.

By adopting a sucker as a fixing means, an aquarium will never be damaged when a supporting rod is fixed in an aquarium.

Although the invention has been described in connection with specific embodiments, the invention is not limited to such embodiments and as would be apparent to those skilled in the art, various substitutions and modifications within the scope and spirit of the invention are contemplated.

What is claimed is:

1. A floating island for an aquarium, comprising:
   a board-shaped floating island body;
   at least one supporting rod combined with said floating island body so that said floating island body can move up and down; and a fixing means so as to fix said at least one supporting rod in an upright state in an aquarium.

2. A floating island for an aquarium as recited in claim 1, wherein an inserting opening is formed in said floating island body so that said at least one supporting rod is slidably inserted therein.

3. A floating island for an aquarium as recited in claim 1, wherein the island comprises an inserting opening having a cylindrical wall portion surrounding said supporting rod with a given length.

4. A floating island for an aquarium as recited in claim 1, wherein said floating body has an opened bottom end.

5. A floating island for an aquarium as recited in claim 1, wherein a plurality of independent bottom-opened spaces are formed in said floating island body so as to form air spaces for giving buoyancy to said floating island body when said floating island body is set on water.

6. A floating island for an aquarium as recited in claim 1, wherein wall-shaped ribs are integrally formed lengthwise and crosswise at the bottom of said floating island body so that a plurality of bottom-opened spaces surrounded by a top wall portion of said floating island body and the ribs are formed, and wherein each bottom-opened space provides an air space so as to give buoyancy to said floating island body.

7. A floating island for an aquarium as recited in claim 1, 2, 3, 4, 5 or 6, wherein said floating island body is an integrally molded plastic article.

8. A floating island for an aquarium as recited in claim 1, wherein said at least one supporting rod is formed to imitate a trunk of a tree.

9. A floating island for an aquarium as recited in claim 1, wherein said fixing means is a sucker with an attachment for fixing said at least one supporting rod.

10. A floating island for an aquarium, comprising:

a board-shaped floating island body;

a plurality of supporting rods slidably penetrating in said floating island body in the direction of its thickness at suitable portions thereof; and fixing means to fix said supporting rods in an upright state in an aquarium;

wherein said floating island body is an integrally molded plastic article having a bottom-opened space, the space giving buoyancy to said floating island body by forming air spaces when said floating island body is set on water; and wherein said fixing means includes suckers with an attachment for fixing said supporting rods.

11. A floating island for an aquarium as recited in claim 10, wherein said floating island body is provided with cylindrical inserting openings for slidably inserting said supporting rods.

12. A floating island for an aquarium, comprising:

a board-shaped floating island body;

a pair of supporting rods slidably penetrating in said floating island body in the direction of the thickness at two positions; and fixing means to fix said two supporting rods in an upright state in a aquarium;

wherein said floating island body is an integrally molded plastic article, the body having wall-shaped ribs formed lengthwise and crosswise at the bottom of said floating body so as to form a plurality of independent bottom-opened spaces surrounded by a top wall portion of said floating island body and the ribs, the spaces giving buoyancy to said floating island body by forming air spaces when said floating island body is set on water;

wherein the fixing means includes suckers having an attachment detachably attached to said supporting rods; and wherein said supporting rods are formed to imitate a trunk of a tree.

* * * * *